(12) United States Patent
Chae et al.

(10) Patent No.: US 11,120,785 B2
(45) Date of Patent: Sep. 14, 2021

(54) VOICE SYNTHESIS DEVICE

(71) Applicant: LG ELECTRONICS INC., Seoul (KR)

(72) Inventors: Jonghoon Chae, Seoul (KR); Yongchul Park, Seoul (KR); Siyoung Yang, Seoul (KR); Juyeong Jang, Seoul (KR); Sungmin Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 98 days.

(21) Appl. No.: 16/547,323

(22) Filed: Aug. 21, 2019

(65) Prior Publication Data

US 2020/0074981 A1 Mar. 5, 2020

(30) Foreign Application Priority Data

Sep. 4, 2018 (KR) ........................ 10-2018-0105487

(51) Int. Cl.
| | | |
|---|---|---|
| *G10L 13/08* | (2013.01) | |
| *G10L 25/63* | (2013.01) | |
| *G10L 25/90* | (2013.01) | |
| *G10L 13/033* | (2013.01) | |
| *G06F 40/58* | (2020.01) | |
| *G10L 13/00* | (2006.01) | |

(52) U.S. Cl.
CPC .............. *G10L 13/08* (2013.01); *G06F 40/58* (2020.01); *G10L 13/00* (2013.01); *G10L 13/0335* (2013.01); *G10L 25/63* (2013.01); *G10L 25/90* (2013.01)

(58) Field of Classification Search
CPC ................................ G10L 13/08; G10L 17/18
USPC .......................................................... 704/260
See application file for complete search history.

(56) References Cited

U.S. PATENT DOCUMENTS 9,070,363 B2 * 6/2015 Waibel ................. G10L 15/187
9,978,374 B2 * 5/2018 Heigold ................ G10L 17/18
(Continued)

FOREIGN PATENT DOCUMENTS

JP 2008243043 10/2008
JP 2013017119 1/2013
(Continued)

OTHER PUBLICATIONS

PCT International Application No. PCT/KR2019/010234, Written Opinion of the International Searching Authority dated Nov. 26, 2019, 8 pages.
(Continued)

*Primary Examiner* — Susan I McFadden
(74) *Attorney, Agent, or Firm* — Lee, Hong, Degerman, Kang & Waimey

(57) ABSTRACT

A voice synthesis device which includes a database configured to store a voice and a text corresponding to the voice and a processor configured to extract characteristic information and a tone of a first-language voice stored in the database, classify an utterance style of an utterer on basis of the extracted characteristic information, generate utterer analysis information including the utterance style and the tone, translate a text corresponding to the first-language voice into a second language, and synthesize the text, translated into the second language, in a second-language voice by using the utterer analysis information.

12 Claims, 7 Drawing Sheets

(56) References Cited

U.S. PATENT DOCUMENTS

| | | |
|---|---|---|
| 10,216,729 B2 * | 2/2019 | Kim .................... H04M 1/6041 |
| 2008/0243474 A1 | 10/2008 | Furihata et al. |
| 2012/0239390 A1 | 9/2012 | Fume et al. |
| 2013/0218568 A1 | 8/2013 | Tamura et al. |
| 2015/0057994 A1 * | 2/2015 | Fang .................... G06F 40/242 |
| | | 704/4 |
| 2017/0255616 A1 | 9/2017 | Yun et al. |
| 2020/0043464 A1 * | 2/2020 | Chae ........................ G06N 3/04 |
| 2020/0058290 A1 * | 2/2020 | Chae ........................ G10L 15/02 |

FOREIGN PATENT DOCUMENTS

| | | |
|---|---|---|
| KR | 1020120117041 | 10/2012 |
| KR | 1020170103209 | 9/2017 |

OTHER PUBLICATIONS

Korean Intellectual Property Office Application No. 10-2018-0105487, Office Action dated Jan. 28, 2020, 5 pages.

\* cited by examiner

VOICE SYNTHESIS DEVICE

CROSS-REFERENCE TO RELATED APPLICATIONS

Pursuant to 35 U.S.C. § 119(a), this application claims the benefit of earlier filing date and right of priority to Korean Patent Application No. 10-2018-0105487, filed on Sep. 4, 2018, the contents of which are hereby incorporated by reference herein in its entirety.

BACKGROUND

Field of the Invention

The present invention relates to a voice synthesis device.

Discussion of the Related Art

Artificial intelligence (AI) is in the field of information technology and computer engineering for researching a method of allowing a computer to perform thinking, learning, and self-development based on intelligence of humans, and denotes that computers imitate intelligent behaviors of humans.

Moreover, AI is indirectly and directly much associated with the field of computer engineering without existing itself. Particularly, an AI component is applied to various fields of information technology recently, and an attempt to solve problems in the fields is being very actively made.

A voice agent service using AI is a service which provides information needed for a user in response to a voice of the user.

A related art voice agent service, which dubs or interprets a foreign language to provide Korean corresponding to the foreign language, merely provides an overall voice uttered by a specific voice actor regardless of a tone or style of an original utterer.

Due to this, in a case of providing content such as movie, there is a limitation in that a viewer cannot feel an utterance effect of an original utterer as-is.

SUMMARY

The present invention is for solving the above-described problem and another problem.

An aspect of the present invention is directed to providing a voice synthesis device for providing viewers with a dubbing or interpretation voice in which a tone or style of an original utterer is reflected.

To achieve these and other advantages and in accordance with the purpose of the disclosure, as embodied and broadly described herein, there is provided a voice synthesis device including a database configured to store a voice and a text corresponding to the voice and a processor configured to extract characteristic information and a tone of a first-language voice stored in the database, classify an utterance style of an utterer on basis of the extracted characteristic information, generate utterer analysis information including the utterance style and the tone, translate a text corresponding to the first-language voice into a second language, and synthesize the text, translated into the second language, in a second-language voice by using the utterer analysis information.

In another aspect of the present invention, there is provided an operating method of a voice synthesis device, the operating method including extracting characteristic information and a tone of a first-language voice stored in a database, classifying an utterance style of an utterer, based on the extracted characteristic information, generating utterer analysis information including the utterance style and the tone, translating a text corresponding to the first-language voice into a second language, and synthesizing the text, translated into the second language, in a second-language voice by using the utterer analysis information.

An additional scope of an application possibility of the present invention will become clear from the following detailed description. However, various modifications and corrections in the spirit and scope of the present invention can be understood by those skilled in the art, and thus, it should be understood that the detailed description and embodiments of the present invention are merely given as examples.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that if an element is referred to as being "connected with" another element, the element can be directly connected with the other element or intervening elements may also be present. In contrast, if an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like.

By way of non-limiting example only, further description will be made with reference to particular types of terminals. However, such teachings apply equally to other types of terminals, such as those types noted herein. In addition, these teachings may also be applied to stationary terminals such as digital TV, desktop computers, and the like.

Figure 1:
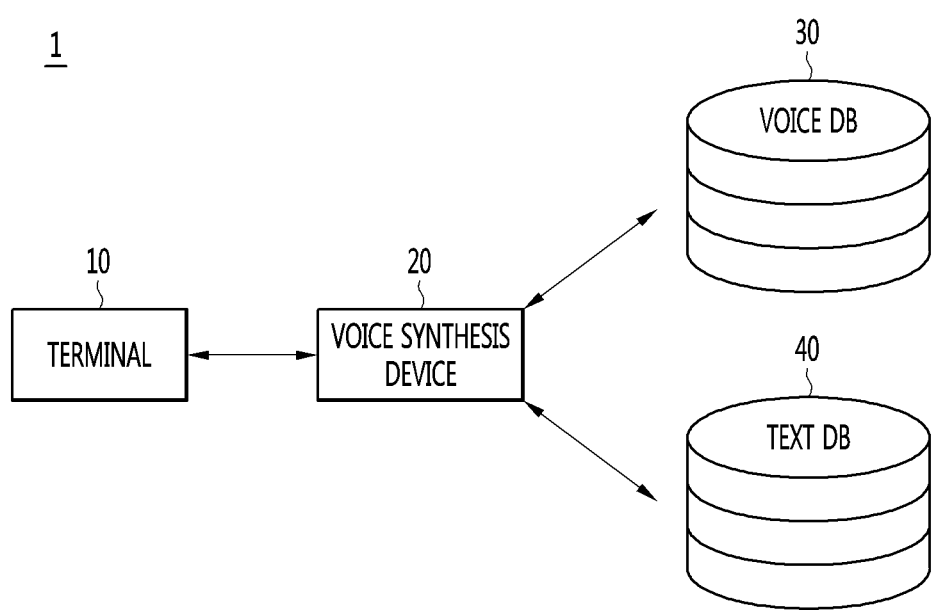
FIG. 1 is a diagram for describing a configuration of a voice synthesis system according to an embodiment of the present invention.

FIG. 1 is a diagram for describing a configuration of a voice synthesis system 1 according to an embodiment of the present invention.

The voice synthesis system 1 according to an embodiment of the present invention may include a terminal 10, a voice synthesis device 20, a voice database 30, and a text database 40.

The voice synthesis device 20 may convert a first-language voice, stored in the voice database 30, into a second-language voice.

The terminal 10 may receive a synthesis voice, converted into the second-language voice, from the voice synthesis device 20.

The voice database 30 may store the first-language voice included in content.

The voice database 30 may store a synthesis voice where the first-language voice is converted into the second-language voice.

The text database 40 may store a first text, corresponding to the first-language voice, and a second text where the first text is translated in the second language.

The voice database 30 and the text database 40 may also be included in the voice synthesis device 20.

Figure 2:
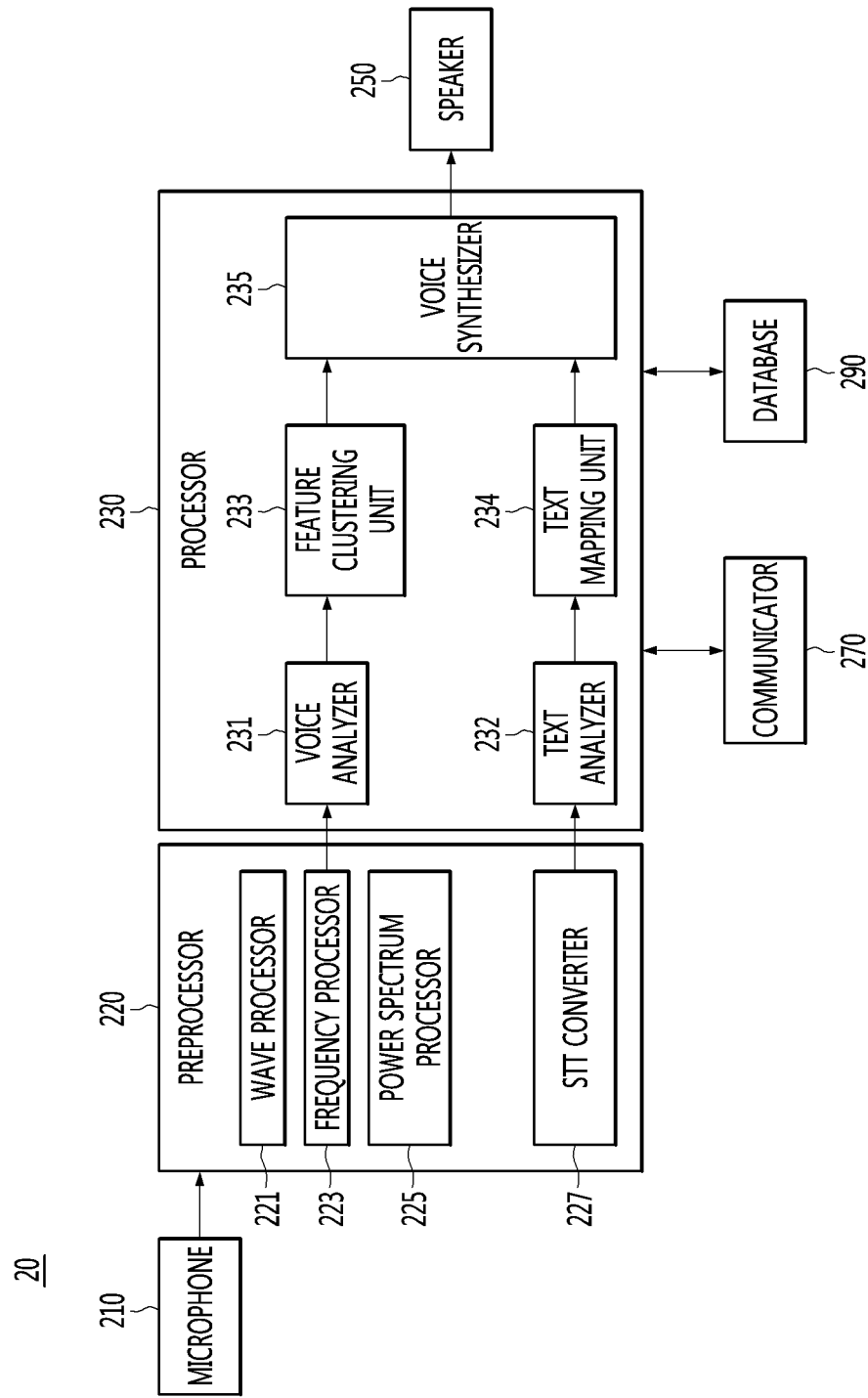
FIG. 2 is a block diagram for describing a configuration of a voice synthesis device according to an embodiment of the present invention.

FIG. 2 is a block diagram for describing a configuration of a voice synthesis device 20 according to an embodiment of the present invention.

Referring to FIG. 2, the voice synthesis device 20 may include a microphone 210, a preprocessor 220, a processor 230, a speaker 250, a communicator 270, and a database 290.

The microphone 210 may receive a voice of an utterer.

The microphone 210 may process an external sound signal into electrical voice data.

The processed voice data may be variously used based on a function (or an application program which is being executed) which is being performed by the voice synthesis device 20. Various noise removal algorithms for removing noise occurring in a process of receiving an external sound signal may be implemented in the microphone 210.

The preprocessor 220 may preprocess a voice received through the microphone 210 or a voice stored in the database 290.

The preprocessing may be a task of extracting the waveform, frequency band, and power spectrum of the speech from the speech.

The preprocessing unit 220 may be included in the processor 230 or may exist separately.

The preprocessor 220 and the processor 230 to be described later may be implemented as one chip or two chips.

The preprocessor 220 may include a wave processor 221, a frequency processor 223, a power spectrum processor 225, and a speech-to-text (STT) converter 227.

The wave processor 221 may extract a waveform of a voice.

The frequency processor 223 may extract a frequency band of a voice.

The power spectrum processor 225 may extract a power spectrum of a voice.

When a waveform varying with time is assigned, the power spectrum may be a parameter representing the kind of the frequency component included in a waveform and a level of the frequency component.

The STT converter 227 may convert a voice into a text.

The STT converter 227 may convert a voice of a specific language into a text of a corresponding language.

The processor 230 may control an overall operation of the voice synthesis device 20.

The processor 230 may include a voice analyzer 231, a text analyzer 232, a feature clustering unit 233, a text mapping unit 234, and a voice synthesizer 235.

The voice analyzer 231 may extract characteristic information about a voice by using one or more of a waveform of the voice, a frequency band of the voice, and a power spectrum of the voice extracted by the preprocessor 220.

The characteristic information about the voice may include one or more of sex information about an utterer, a pitch of the voice, a locution of the utterer, an utterance speed of the utterer, and an emotion of the utterer.

Moreover, the characteristic information about the voice may further include a tone of the utterer.

The text analyzer 232 may extract a main expression phrase from a text converted by the STT converter 227.

When an inflection between phrases is changed, the text analyzer 232 may extract an inflection-changing phrase as a main expression phrase.

When a frequency band between phrases varies equal to or higher than a predetermined band, the text analyzer 232 may determine that an inflection is changed.

The text analyzer 232 may extract a main word from a phrase of a changed text. The main word may be a noun included in the phrase, but is merely embodiment.

The feature clustering unit 233 may classify an utterance style of the utterer by using the characteristic information about the voice extracted by the voice analyzer 231.

The feature clustering unit 233 may assign a weight value to each of style items constituting the characteristic information about the voice to classify the utterance style of the utterer.

The text mapping unit 234 may translate a text, converted into a first language, into a second-language text.

The text mapping unit 234 may map the text, converted into the second language, to the first-language text.

The text mapping unit 234 may map a main expression phrase constituting the first-language text to a second-language phrase corresponding thereto.

The text mapping unit 234 may map an utterance style, corresponding to the main expression phrase constituting the first-language text, the second-language phrase. This is for applying the classified utterance style to the second-language phrase.

The voice synthesizer 235 may apply a tone of the utterer and the utterance style, classified by the feature clustering unit 233, to a main expression phrase of the text translated into the second language by the text mapping unit 234, thereby generating a synthesized voice.

The speaker 250 may output the synthesized voice.

The communicator 270 may perform wired or wireless communication with the terminal 10 or an external server.

The database 290 may include the voice database 30 and the text database 40 described above with reference to FIG. 1.

The database 290 may store a first-language voice included in content.

The database 290 may store a synthesis voice obtained by converting the first-language voice into a second-language voice.

The database 290 may store a first text corresponding to the first-language voice and a second text obtained by translating the first text into the second language.

The elements illustrated in FIG. 2 may be included in the terminal 10 illustrated in FIG. 1. That is, the terminal 10 of FIG. 1 may perform the same operations as operations performed by the voice synthesis device 20.

Figure 3:
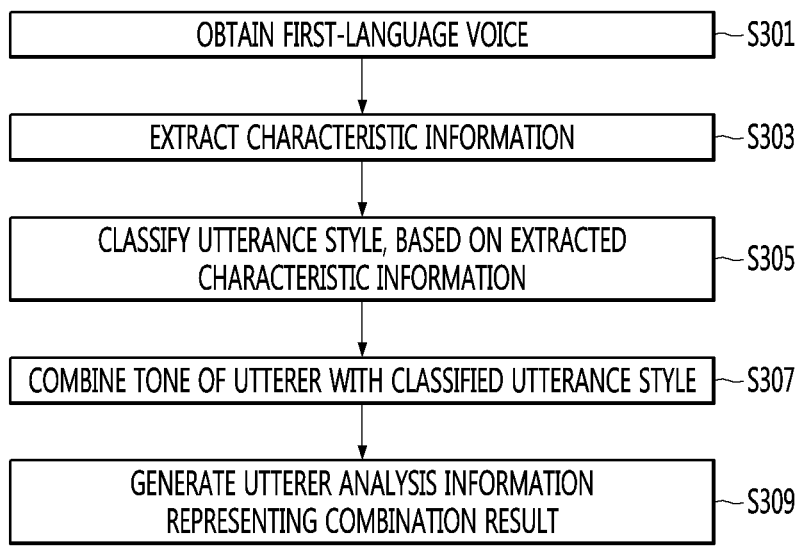
FIG. 3 is a flowchart for describing an operating method of a voice synthesis device according to an embodiment of the present invention.

FIG. 3 is a flowchart for describing an operating method of the voice synthesis device according to an embodiment of the present invention.

Referring to FIG. 3, in step S301, the microphone 210 of the voice synthesis device 20 may obtain a first-language voice uttered by an utterer.

In an embodiment, the utterer may be an actor who appears in an image of movie.

The microphone 210 may receive the first-language voice uttered by an actor who appears in one scene of all images. The one scene may be an image having a certain time period constituting an image.

Here, the first language may be English, but this is merely an embodiment.

In step S303, the processor 230 of the voice synthesis device 20 may extract characteristic information about a voice from the obtained first-language voice.

In an embodiment, the preprocessor 220 of the voice synthesis device 20 may preprocess the first-language voice.

The preprocessor 220 may extract a waveform of the voice, a frequency of the voice, and a power spectrum of the voice from the first-language voice.

The processor 230 may extract the tone of the utterer from information extracted by the preprocessor 220. For example, the processor 230 may extract the tone of the utterer, based on the frequency of the voice. In detail, the processor 230 may extract a frequency band of the voice and may determine, as the tone of the utterer, a main sound band (or a formant) in the extracted frequency band.

The processor 230 may extract the characteristic information about the voice by using the extracted waveform of the voice, the extracted frequency of the voice, and the extracted power spectrum of the voice.

The characteristic information about the voice may include one or more of sex of the utterer uttering the voice, a tone of the utterer, a pitch of the voice, an utterance speed of the utterer, and an emotion of the utterer.

As described below, each of the sex of the utterer uttering the voice, the tone of the utterer, the pitch of the voice, the utterance speed of the utterer, and the emotion of the utterer may be a style item representing a utterance style.

Moreover, in an embodiment of the present invention, the tone of the utterer may be included in the characteristic information about the voice.

In step S305, the processor 230 of the voice synthesis device 20 may classify an utterance style of the utterer, based on the extracted characteristic information about the voice.

In an embodiment, the processor 230 may classify the utterance style of the utterer by using the extracted characteristic information about the voice. In detail, the processor 230 may assign a weight value to each of style items constituting the characteristic information about the voice to classify the utterance style of the utterer.

This will be described below.

In step S307, the processor 230 of the voice synthesis device 20 may combine the classified utterance style with the classified tone of the utterer.

The processor 230 may combine the classified utterance style with the classified tone of the utterer. The tone of the utterer may be used to synthesize the first-language voice into a second-language voice later.

In step S309, the processor 230 of the voice synthesis device 230 may generate utterer analysis information including a combination result.

That is, the utterer analysis information may include information about the tone of the utterer and the utterance style corresponding thereto.

Hereinafter, the embodiment of FIG. 3 will be described in detail.

Figure 4:
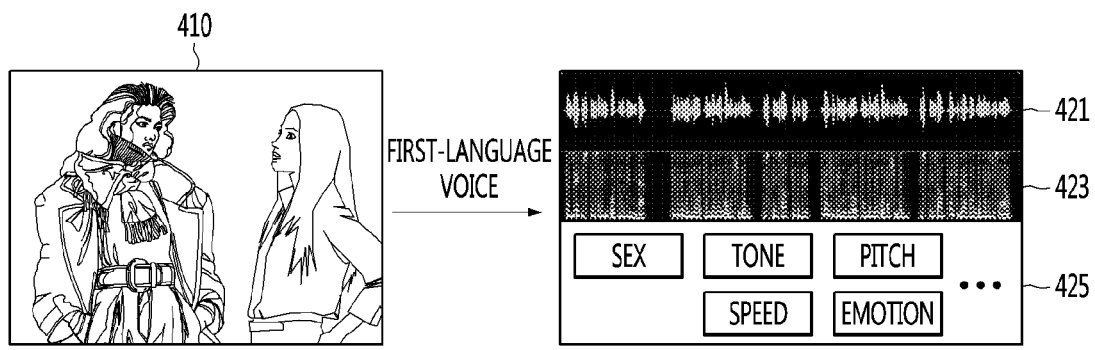
FIG. 4 is a diagram for describing an example where characteristic information about a voice is extracted from a first-language voice of an utterer, according to an embodiment of the present invention.

FIG. 4 is a diagram for describing an example where characteristic information about a voice is extracted from a first-language voice of an utterer, according to an embodiment of the present invention.

Referring to FIG. 4, the microphone 210 may receive a first-language voice uttered by an actor who appears in one scene 410 of movie.

The preprocessor 220 may preprocess the first-language voice and may extract a waveform 421 and a power spectrum 423 corresponding to the first-language voice, based on a preprocessing result.

The processor 230 may extract characteristic information 425 about a voice by using the extracted waveform 421 and power spectrum 423.

The characteristic information 425 about the voice may include one or more of sex information about an utterer, a tone of the utterer, a pitch of the voice, an utterance speed of the utterer, and an emotion of the utterer.

The processor 230 may use the frequency band of the power spectrum 423 to determine the height of the voice.

For example, the processor 230 may determine the degree of the pitch of the sound according to the magnitude of the amplitude, within a certain frequency band range.

The processor 230 may determine the tone of the utterer using the frequency band of the power spectrum 423. For example, the processor 230 may determine the frequency band of the amplitude of the power spectrum 423 to be the utterer's main band, and determine the determined band of the user as the tone of the utterer.

The processor 230 may determine the utterer's speaking rate from the converted text data, through the number of syllables uttered per unit time.

For example, when the frequency band of the power spectrum 423 is within the predetermined first frequency band range, the processor 230 may determine the utterer's sex as a man.

The processor 230 may determine the sex of the utterer as an exciter when the frequency band of the power spectrum 423 is within the predetermined second frequency band range. Here, the second frequency band range may be larger than the first frequency band range.

The processor 230 may determine the emotional state of the utterer based on the strength of the voice signal 421. For example, the processor 230 may determine the emotions of the speaker as sad emotions if the average intensity of the voice signal 421 is less than or equal to the first intensity for a certain period of time.

The processor 230 may determine the emotion of the speaker as a pleasant emotion if the average intensity of the voice signal 421 is less than or equal to a second intensity greater than the first intensity.

The processor 230 may determine the speaker's emotions as an anger feeling if the average intensity of the voice signal 421 is greater than a second intensity.

Figure 5A:
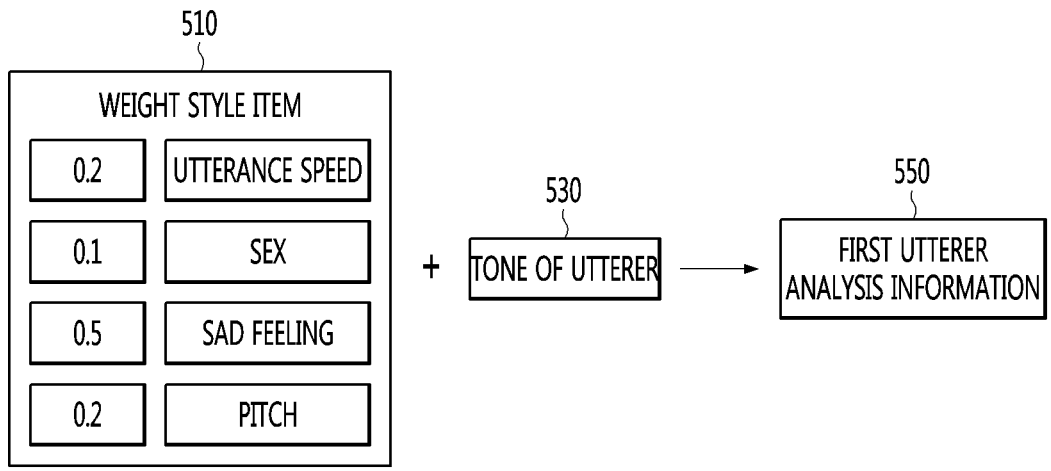
FIGS. 5A and 5B are diagrams for describing a process of extracting an utterance style of an utterer from characteristic information about a voice and combining the extracted utterance style with a tone of the utterer to generate utterer analysis information, according to an embodiment of the present invention.
Figure 5B:
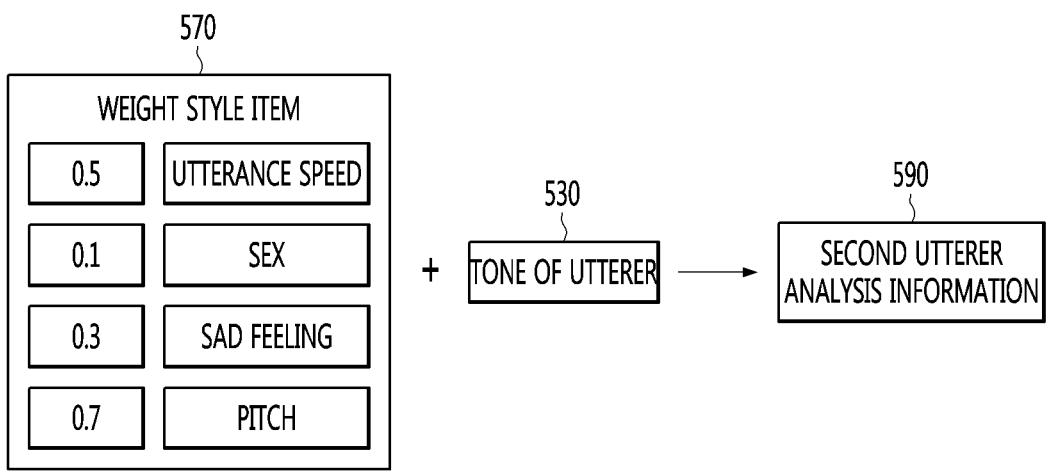

FIGS. 5A and 5B are diagrams for describing a process of extracting an utterance style of an utterer from characteristic information about a voice and combining the extracted utterance style with a tone of the utterer to generate utterer analysis information, according to an embodiment of the present invention.

First, referring to FIG. 5A, a first utterance style 510 representing a correspondence relationship between an utterance style item and a weight value corresponding to the utterance style item is illustrated.

Each of utterance items may be applied in units of one sentence or phrase constituting a text.

For example, when the text includes two sentences, different utterance styles may be applied to the two sentences.

As another example, when two phrases are included in one sentence, different utterance styles may be applied to the two phrases.

In FIGS. 5A and 5B, an example where a weight value has a value between zero and one will be described.

It may be assumed that, when an utterance style item is an utterance speed, an utterance speed increases as a weight value is closer to one and decreases as the weight value is closer to zero.

For example, the processor 230 may set a weight value of an utterance speed item to 0.2, based on an utterance speed extracted from a first-language voice.

It may be assumed that, when an utterance style item is sex, a voice is close to a voice of a woman as a weight value is closer to one and is close to a voice of a man as the weight value is closer to zero.

The processor 230 may set a weight value of a sex item to 0.1, based on sex information extracted from the first-language voice.

It may be assumed that, when an utterance style item is sad feeling, a degree of sadness is high as a weight value is closer to one and is low as the weight value is closer to zero.

The processor 230 may use the strength of the speech signal to determine the weight of the sad emotion item. For example, when the emotion state of the user is determined to be a sad emotional state, the processor 230 may set the weight to be larger as the intensity of the voice signal increases, as the intensity of the voice signal decreases.

The strength of the speech signal may be divided into a plurality of levels, and the plurality of levels may correspond to weights having an interval of 0.1.

It may be assumed that, when an utterance style item is a volume of a sound, a sound is high as a weight value is closer to one and is low as the weight value is closer to zero.

The processor 230 may set a weight value of a sound volume item to 0.2, based on a pitch extracted from the first-language voice.

In this manner, the processor 230 may assign a weight value to each of a plurality of utterance style items to obtain the first utterance style 510 of an utterer.

According to an embodiment of the present invention, when a weight value is assigned to each of a plurality of utterance style items and an utterance style of an utterer is extracted, an utterance style of the utterer may be more accurately checked in a corresponding scene.

The processor 230 may combine the obtained first utterance style 510 with a tone 530 of the utterer to generate a first utterer analysis information 550.

The generated first utterer analysis information 550 may be used in a process of converting the first-language voice into a second-language voice later.

Referring to FIG. 5B, an example of a second utterance style 570 is illustrated.

That is, different utterance styles may be applied to tones of the same utterer, based on an uttered sentence or phrase.

Referring to FIG. 5B, the second utterance style 570 where a weight value "0.5" is applied to an utterance speed item, a weight value "0.1" is applied to a sex item, a weight value "0.3" is applied to a sad feeling item, and a weight value "0.7" is applied to a sound volume item is illustrated.

The processor 230 may combine the obtained second utterance style 570 with a tone 530 of the utterer to generate a second utterer analysis information 590.

When one text includes two sentences or one sentence includes two phrases, the processor 230 may classify each sentence or each phrase into different utterance styles.

Therefore, a voice style of a real actor may be provided to a viewer in a translated voice.

Figure 6:
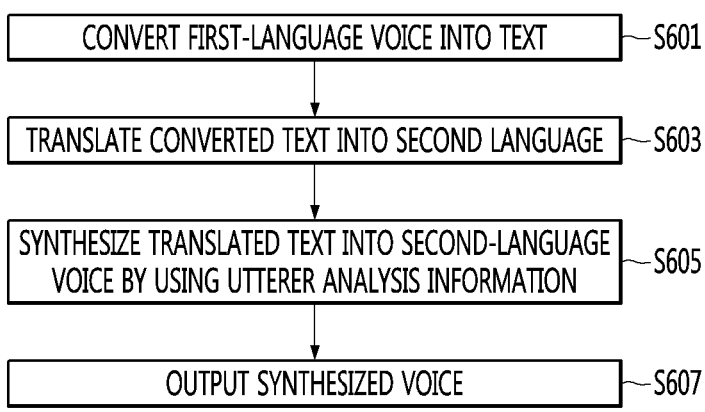
FIG. 6 is a flowchart for describing a process of synthesizing second-language voices on the basis of the utterer analysis information generated through the process of FIG. 3, according to an embodiment of the present invention.

FIG. 6 is a flowchart for describing a process of synthesizing second-language voices on the basis of the utterer analysis information generated through the process of FIG. 3, according to an embodiment of the present invention.

Referring to FIG. 6, in step S601, the preprocessor 220 of the voice synthesis device 20 may convert a first-language voice of an utterer into a text.

The STT converter 227 included in the preprocessor 220 may convert the first-language voice into a first-language text.

In step S603, the processor 230 of the voice synthesis device 20 may translate the text, converted into the first language, into a second language.

In an embodiment, when the first language is English, the second language may be Korean.

In an embodiment, the processor 230 may map the text, converted into the first language, to the text translated into the second language. In detail, the processor 230 may extract main expressions from the text converted into the first language and may map translated expressions respectively corresponding to the extracted main expressions.

In step S605, the processor 230 of the voice synthesis device 20 may synthesize the text, translated into the second language, into a second-language voice by using utterer analysis information.

First, the processor 230 may generate a translation synthesis voice corresponding to the text translated into the second language by using a tone of an utterer included in the utterer analysis information which is generated in step S309 of FIG. 3.

Subsequently, the processor 230 may apply an utterance style, included in the utterer analysis information, to the generated translation synthesis voice to generate a final synthesis voice.

In detail, the processor 230 may apply a corresponding weight value to each of a plurality of utterance style items included in the utterance style 510 to generate the final synthesis voice.

In step S607, the processor 230 of the voice synthesis device 20 may output a synthesis voice, synthesized into the second-language voice, to the speaker 250.

In an embodiment, the processor 230 may receive a reproduction request for an image and may output a synthesis voice synthesized into the second-language voice along with the image.

Hereinafter, the embodiment of FIG. 6 will be described.

Figure 7:
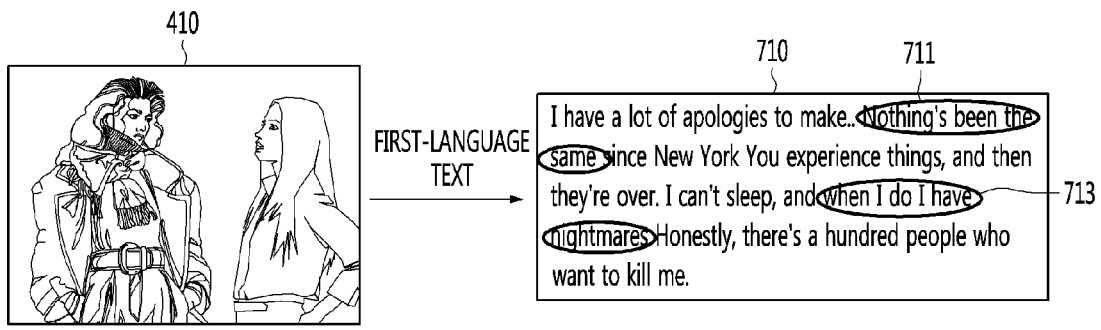
FIGS. 7 to 9 are diagrams for describing a process of generating a second-language synthesis voice by using the utterer analysis information, according to an embodiment of the present invention.
Figure 8:
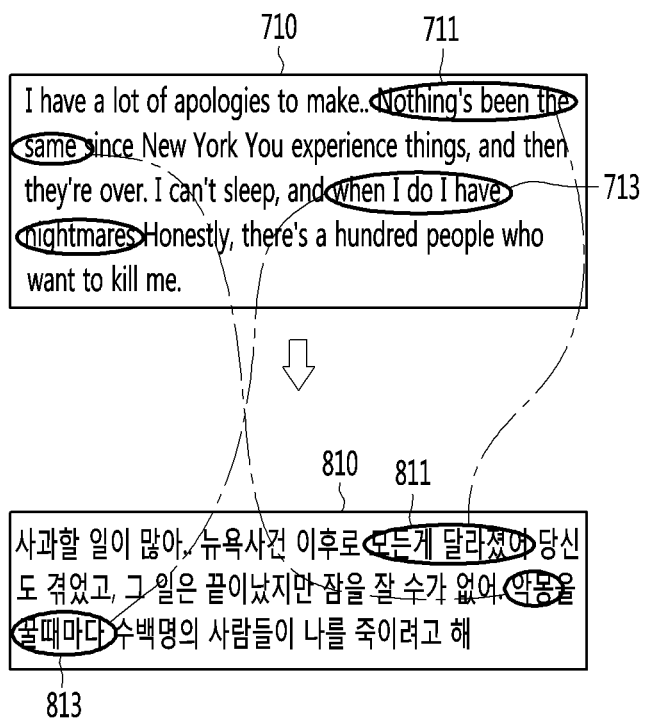
Figure 9:
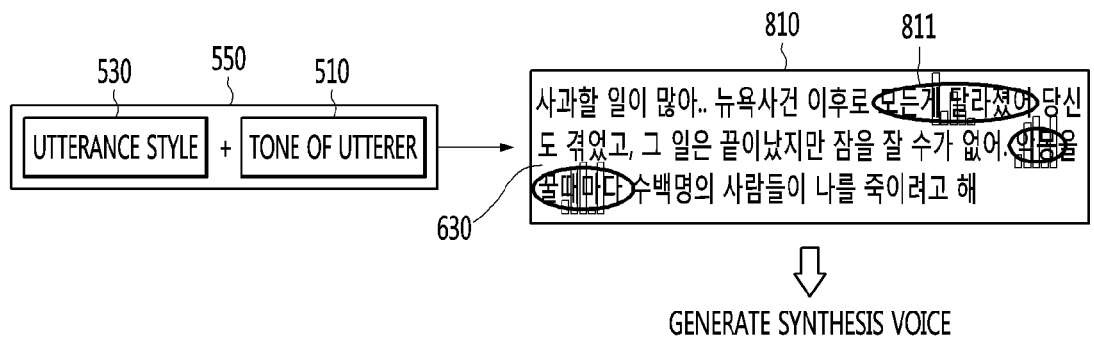

FIGS. 7 to 9 are diagrams for describing a process of generating a second-language synthesis voice by using the utterer analysis information, according to an embodiment of the present invention.

In FIGS. 7 to 9, it may be assumed that a first language is English and a second language is Korean.

Referring to FIG. 7, one scene 410 of movie is illustrated.

The STT 227 of the preprocessor 220 may convert a voice, uttered in a first language by an actor, into a text 710 in the scene 410.

When a plurality of sentences are included in a text corresponding to the first-language voice, the processor 230 may extract characteristic information from each of the plurality of sentences and may generate a plurality of utterance styles respectively corresponding to the plurality of sentences, based on the extracted characteristic information.

In FIGS. 7 to 9, an example where an utterance style is applied to a main expression will be described.

Substantially, the processor 230 may apply an utterance style to a whole text translated into the second language to generate a synthesis voice.

The first-language text 710 may include main expressions 711 and 713. Here, each of the main expressions 711 and 713 is merely an embodiment.

The text analyzer 232 included in the processor 230 may extract main expressions 711 and 713 from the first-language text 710.

When the text analyzer 232 detects a change in an inflection between phrases from the text 710, the text analyzer 232 may extract an expression, where an inflection is changed, as a main expression.

Subsequently, as illustrated in FIG. 8, the processor 230 may translate the first-language text 710 into a second-language text 810.

The processor 230 may respectively map the main expressions 711 and 713, extracted from the first-language text 710, to translation expressions 811 and 813 included in the second-language text 810.

For example, the processor 230 may map a first main expression 711 to a first translation expression 811 and may map a second main expression 713 to a second translation expression 813.

Subsequently, as illustrated in FIG. 9, the processor 230 may apply utterer analysis information to each of the translation expressions 811 and 813 included in the second-language text 810.

In an embodiment, the utterer analysis information may be applied in units of one phrase or one sentence.

For example, the processor 230 may apply first utterer analysis information to the first translation expression 811 to generate a synthesis voice and may apply second utterer analysis information to the second translation expression 813 to generate a synthesis voice.

For example, when the first utterer analysis information includes a first utterance style 510 included in FIG. 5A and the second utterer analysis information includes a second utterance style 530 included in FIG. 5B, the processor 230 may apply the first utterance style 510 to the first translation expression 811 to generate a synthesis voice and may apply the second utterance style 570 to the second translation expression 813 to generate a synthesis voice.

The processor 230 may apply a tone 530 of an utterer to the text 810 translated into the second language and may generate a translation synthesis voice translated into the second language.

Subsequently, the processor 230 may apply the utterance style 510 to the generated translation synthesis voice to generate a final synthesis voice. The translation synthesis voice may be a machine sound which is uttered in the same inflection.

The processor 230 may combine the translation synthesis voice with a voice characteristic to which a weight value of each of utterance style items included in the utterance style 510 is applied, thereby generating the final synthesis voice.

As described above, when the utterance style is applied to the translation synthesis voice, an effect where a real utterer utters in a translated voice may be obtained, and thus, a content watching immersion of a viewer may be enhanced.

In FIGS. 7 to 9, an utterance style and a tone may be applied to only main expressions in a translated text, and thus, a synthesis voice may be generated. However, this is merely an embodiment. In other embodiments, a synthesis voice may be generated by applying an utterance style and a tone to a whole text.

Figure 10:
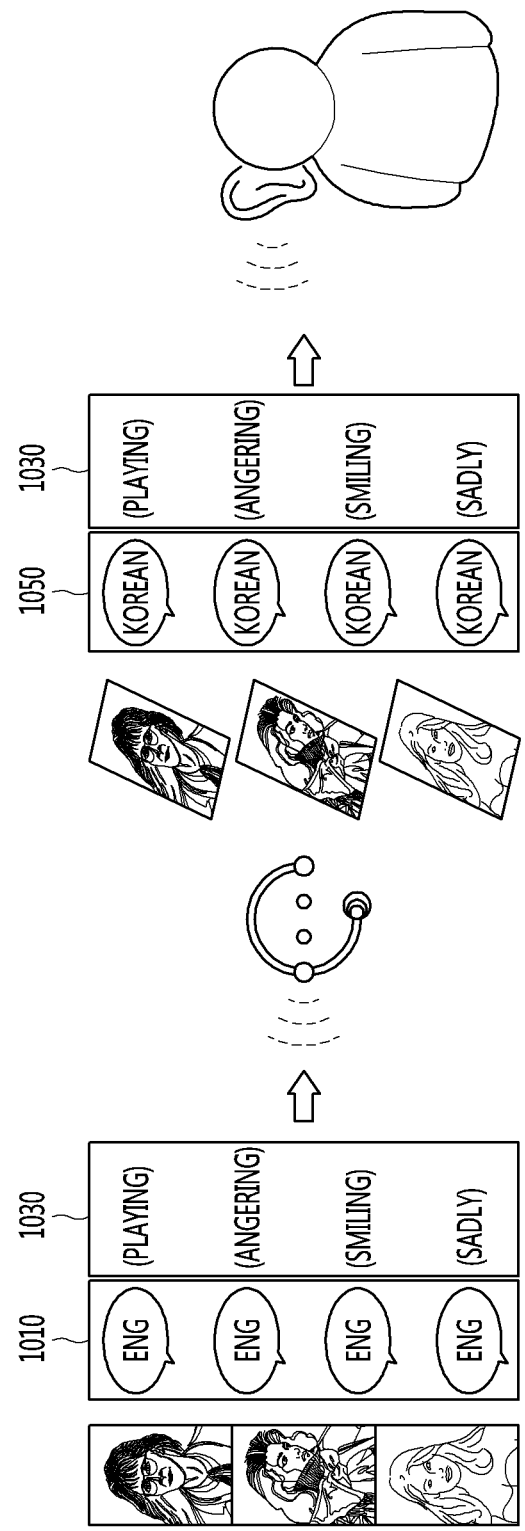
FIG. 10 is a diagram for schematically describing a scenario which provides a viewer with a first-language voice and a second-language voice where a tone and voice style (or an utterance style) of an utterer are reflected in a voice of the utterer, according to an embodiment of the present invention.

FIG. 10 is a diagram for schematically describing a scenario which provides a viewer with a first-language voice and a second-language voice where a tone and voice style (or an utterance style) of an utterer are reflected in a voice of the utterer, according to an embodiment of the present invention.

Referring to FIG. 10, each of utterers may utter with having a specific utterance style 1030.

The voice synthesis device 20 may generate a voice of a second language 1050 to which a tone and an utterance style 1030 of an utterer are applied.

Subsequently, in a case of reproducing content such as movie, a viewer may listen to a voice such as being dubbed by a real actor without listening to a dubbing voice uttered by a voice actor.

Therefore, the demand of dubbing where a voice and a style are applied to each utterance of an utterer may satisfy a viewer.

According to the embodiments of the present invention, in a case where a viewer watches content where utterance is performed in foreign language, a dubbing or interpretation voice in which a tone and style of an original utterer is reflected may be provided, thereby providing the viewer with an enhanced voice service experience.

Moreover, according to the embodiments of the present invention, an effect where an utterer actually utters in a translated voice may be provided, and thus, a content watching immersion of a viewer may be enhanced.

The present invention mentioned in the foregoing description may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A voice synthesis device comprising:
   a memory configured to store speech audio and corresponding text in a database; and
   a processor configured to:
   extract characteristic information and a tone of a voice of a first-language speech audio stored in the database, wherein the characteristic information comprises a plurality of style items including a sex of the utterer, a pitch of the voice of the first-language speech audio, an utterance speed of the utterer, and an emotion of the utterer;
   assign a weight value to each of the plurality of style items included in the characteristic information;
   classify an utterance style of an utterer based on combinations of a style item and the assigned weight value corresponding to the style item;
   generate utterer analysis information including the utterance style and the tone;
   translate a text corresponding to the first-language speech audio to a second language; and
   generate a second-language speech audio based on the translated text using the utterer analysis information.

2. The voice synthesis device of claim 1, further comprising a preprocessor configured to extract a waveform of the voice of the first-language speech audio, a frequency band of the voice of the first-language speech audio, and a power spectrum of the voice of the first-language speech audio.

3. The voice synthesis device of claim 2, wherein the processor is further configured to extract the tone and the characteristic information by using one or more of the waveform of the voice of the first-language speech audio, the frequency band of the voice of the first-language speech audio, and the power spectrum of the voice of the first-language speech audio extracted by the preprocessor.

4. The voice synthesis device of claim 1, wherein the processor is further configured to:
   extract characteristic information of a voice from each of a first plurality of sentences of the first-language speech audio; and
   classify a corresponding utterance style for each of the first plurality of sentences based on the extracted characteristic information.

5. The voice synthesis device of claim 4, wherein the generated second-language speech audio comprises a second plurality of sentences which are generated by applying utterer analysis information corresponding to the first plurality of sentences respectively to the second plurality of sentences.

6. The voice synthesis device of claim 1, wherein the tone of the voice of the first-language speech audio is reflected in the generated second-language speech audio by applying the generated utterer analysis information.

7. An operating method of a voice synthesis device, the operating method comprising:
   extracting characteristic information and a tone of a voice of a first-language speech audio stored in a database, wherein the characteristic information comprises a plurality of style items including a sex of the utterer, a pitch of the voice of the first-language speech audio, an utterance speed of the utterer, and an emotion of the utterer;
   assigning a weight value to each of the plurality of style items included in the characteristic information;
   classifying an utterance style of an utterer based on combinations of a style item and the assigned weight value corresponding to the style item;
   generating utterer analysis information including the utterance style and the tone;
   translating a text corresponding to the first-language speech audio to a second language; and
   generate a second-language speech audio based on the translated text using the utterer analysis information.

8. The operating method of claim 7, further comprising:
   extracting characteristic information of a voice from each of a first plurality of sentences of the first-language speech audio, and
   classifying a corresponding utterance style for each of the first plurality of sentences based on the extracted characteristic information.

9. The operating method of claim 8, wherein the generated second-language speech audio comprises a second plurality of sentences which are generated by applying utterer analysis information corresponding to the first plurality of sentences respectively to the second plurality of sentences.

10. The operating method of claim 7, further comprising extracting a waveform of the voice of the first-language speech audio, a frequency band of the voice of the first-language speech audio, and a power spectrum of the voice of the first-language speech audio.

11. The operating method of claim 10, wherein:
    extracting the tone and the characteristic information is performed by using one or more of the waveform of the voice of the first-language speech audio, the frequency band of the voice of the first-language speech audio, and the power spectrum of the voice of the first-language speech audio.

12. The operating method of claim 11, wherein the tone of the voice of the first-language speech audio is reflected in the generated second-language speech audio by applying the generated utterer analysis information.

* * * * *